United States Patent [19]
Cowan et al.

[11] Patent Number: 5,488,991
[45] Date of Patent: Feb. 6, 1996

[54] ALUMINA WELLBORE CEMENT COMPOSITION

[75] Inventors: Kenneth M. Cowan, Sugarland; James J. W. Nahm, Houston; Reece E. Wyant, Houston; Robert N. Romero, Houston, all of Tex.

[73] Assignee: Shell Oil Company, Houston, Tex.

[21] Appl. No.: 327,725

[22] Filed: Oct. 24, 1994

[51] Int. Cl.$^6$ ............... E21B 33/13; C04B 24/00; C04B 7/32
[52] U.S. Cl. ............... 166/293; 106/696; 106/819; 106/823; 405/266; 405/267
[58] Field of Search ............... 166/292, 293, 166/294, 295; 106/692, 696, 724, 802, 819, 823, 900, 822; 405/266, 267

[56] References Cited

U.S. PATENT DOCUMENTS

| | | | |
|---|---|---|---|
| 3,180,748 | 4/1965 | Holmgren et al. | |
| 3,605,898 | 9/1971 | Harrison et al. | 166/293 |
| 3,734,188 | 5/1973 | Root et al. | 166/292 |
| 3,794,506 | 2/1974 | Schmidt et al. | 106/900 |
| 4,676,832 | 6/1987 | Childs et al. | 166/293 |
| 4,829,107 | 5/1989 | Kindt et al. | 106/709 |
| 5,226,961 | 7/1993 | Nahm et al. | 106/692 |
| 5,238,064 | 8/1993 | Dahl et al. | 166/293 |
| 5,340,397 | 8/1994 | Brothers | 166/293 |
| 5,348,584 | 9/1994 | Brothers et al. | 106/725 |
| 5,355,955 | 10/1994 | Rodriques et al. | 166/293 |

FOREIGN PATENT DOCUMENTS

| | | | |
|---|---|---|---|
| 0640019 | 12/1978 | U.S.S.R. | 166/293 |
| 1033710 | 8/1983 | U.S.S.R. | 166/293 |
| 1086122 | 4/1984 | U.S.S.R. | 166/293 |

OTHER PUBLICATIONS

"Additives for Oil–Well Cements," *Dowell Schlumberger Cementing Technology*, pp. 3–5, Nova Communications Ltd. London (1984).

*Primary Examiner*—Paul Marcantoni
*Attorney, Agent, or Firm*—Del S. Christensen

[57] ABSTRACT

A high alumina wellbore cementing composition is provided, the composition comprising:
  a) high alumina cement; and
  b) a polyacrylic acid phosphinate having a molecular weight of about 3800 in an amount effective to prevent gelation of the cementing composition for a time period of at least three hours.

This composition can remain pumpable for a time period sufficiently long to place the cement in a wellbore using conventional wellbore cementing procedures, and, after the composition is cured, is capable of withstanding elevated wellbore temperatures.

12 Claims, No Drawings

ALUMINA WELLBORE CEMENT COMPOSITION

FIELD OF THE INVENTION

The present invention relates to a high density wellbore cement composition that can form a pumpable slurry and, after curing, is capable of withstanding elevated wellbore temperatures.

BACKGROUND TO THE INVENTION

Wellbores provided for the purpose of production of oil and gas are typically cased with steel casings, and cement is placed around the annulus of the steel casing. This cement is usually placed by pumping a cement slurry down the casing and out the bottom of the casing into the annulus between the wellbore and the outside of the casing. The slurry must therefore remain pumpable for an extended time period, but it is also desirable for the cement slurry to cure to a reasonable hardness within a short time period after the cement slurry is placed within the wellbore so that the well completion process may proceed.

Cements are available that are capable of withstanding elevated temperatures. Temperatures as high as 1500° F. to 2500° F. may be expected in production or injection wells when some thermal recovery processes are utilized. Provision of wellbore cements that can maintain sufficient strength at these temperatures and have acceptable slurry properties remains a problem.

U.S. Pat. No. 3,734,188 discloses wellbore cement compositions comprising alumina based cements and accelerators for setting those cement. These cements can withstand temperatures of at least 1600° F. according to patent '188.

U.S. Pat. No. 5,226,961 discloses other high temperature cement compositions that are also based on alumina cements. Patent '961 discloses low density aggregates and conversion of drilling muds to alumina cement slurries. In particular, graphite as a low density aggregate that imparts excellent thermal conductivity to the cured cement is disclosed. Magnesium chloride is utilized in these compositions as a set retarder.

U.S. Pat. Nos. 3,180,748 and 3,605,898 address the problem of retarding the setting of cements. Patent '898 discloses heptalactone as a preferred retarding agent for a wide variety of cement slurries that includes alumina cement slurries. Patent '748 discloses boric acid, calcium lignin sulfonate and alkali metal or alkaline earth metal phosphates as retarders for alumina cement slurries. The phosphates are preferred as retarders when the cement slurries include silica flour as an aggregate. Cements disclosed in patent '748 are said to be capable of withstanding temperatures of 1500° F. to 2000° F., and examples are said to remain pumpable for up to three hours and twenty five minutes. Retarders for alumina cement slurries that are more effective than those available in the prior art would still be desirable.

It is therefore an object of the present invention to provide a cement slurry composition that, after being cured, is capable of withstanding service temperatures of 1500° F. to 2500° F. It is a further object to provide such a composition wherein the slurry remains pumpable for more than three hours after initially being blended.

SUMMARY OR THE INVENTION

These and other objects are accomplished by a high alumina wellbore cementing composition comprising:

high alumina cement; and an antigelant selected from the group consisting of phosphino organic acids, phosphonic acids, organic polymers containing phosphinic acid groups, salts thereof, and mixtures thereof in an amount effective to prevent gelation of the cementing composition for a time period of at least three hours.

This composition can be made to remain pumpable for a time period that is long enough for the composition to be placed in a wellbore using conventional wellbore cementing methods. After the composition is cured, the composition is capable of withstanding elevated temperatures for extended time periods.

The composition of the present invention may further comprise a thinner or water reducing agents in an amount effective to render the composition pumpable.

DESCRIPTION OF THE INVENTION

The alumina cements of the present invention are available and known in the industry. Commercially available examples include: "FONDU," containing about 39% by weight $Al_2O_3$, "SECAR 41," containing about 41% by weight $Al_2O_3$, "SECAR 51," containing about 51% by weight $Al_2O_3$, "SECAR 71," containing about 71% by weight $Al_2O_3$, and "SECAR 80," containing about 80% by weight $Al_2O_3$, all available from Lafarge Calcium Aluminates; "LUMNITE," containing about 47% by weight $Al_2O_3$ and "REFCON," containing about 57% by weight $Al_2O_3$, available from Lehigh Portland Cement Co.; and "CA-14," containing about 70% by weight $Al_2O_3$ and "CA-25," containing about 80% by weight $Al_2O_3$, available from Alcoa. Hydraulic components of these cements are compounds of calcium oxide and alumina having principal mineralogical phases of monocalcium aluminate, calcium bialuminate or similar compounds.

The amount of cement in the cementing composition of the present invention is preferably between about 5% and 25% by weight of the total solids in the finished slurry. The remaining 95% to 75% of solids are non-hydraulic, and referred to as "aggregates."

The alumina cement reacts with water present in the slurry and forms hydration products which bind the solids of the slurry together as a set material. If the cement content is appreciably lower than about 5% by weight of the total solids, then the set material does not have enough strength to perform the normal functions of a wellbore cement. More than about five percent by weight of the total solids of alumina cement is therefore preferred.

The slurry of the present invention is intended for use where temperatures of 1500° F. to 2500° F. will be encountered after the slurry has set in the well. Water of the alumina cement's hydration products will be driven off at the high temperatures, leaving a mass that has a relatively high porosity. If a strong, highly heat conductive aggregate is used in the slurry, the amount of cement incorporated into the slurry can be reduced, resulting in a set cement composition that is strong, with a lower porosity that is more conductive, and more heat resistant.

In addition, the alumina cement is quite expensive as compared to the aggregate material. Use of a relatively low proportion of alumina cement in the slurry is both economical and results in a set cement having superior properties. Thus a concentration of the high alumina cement that is less than 25 percent by weight based on the total solids is preferred.

The aggregates of the present invention may be any of the aggregates that are known to be useful in high temperature wellbore cement compositions. Alumina aggregates are preferred when the density resulting from the use of alumina aggregates is acceptable. Graphite may also be a preferred aggregate when the cement will be in a reducing environment in the wellbore and a low density and high thermal conductivity aggregate is desired.

Examples of acceptable high alumina aggregates are fused white alumina (99% $Al_2O_3$), ground calcinated bauxite (88% $Al_2O_3$), "MULCOA 90" (90% $Al_2O_3$), "MULCOA 70"(70% $Al_2O_3$) "MULCOA 60" (60% $Al_2O_3$), "MULCOA 47" (47% $Al_2O_3$). All of the "MULCOA" aggregates are available from C.E. Minerals. The alumina aggregates are particularly preferred because they are very strong, highly heat conductive, and produce a final set material that is very strong and stable at high temperatures.

Fume silica is a preferably included as an aggregate when a dense, highly heat conductive cement is desired. Fume silica is an extremely fine particle material. These extremely fine silica particles fill the pore space between the alumina cement and other aggregate particles, replacing water in the slurry composition and resulting in a slurry composition that has very little water. The resultant set cement therefore has lower porosity and greater thermal conductivity.

The slurries of the present invention require an antigelant to delay the setting reaction until the material can be mixed and placed in a wellbore. Known cement retarders such as lignosulfonates provide a retardation of the actual setting reaction (as evidenced by an exotherm). Alumina cement slurries are subject to an additional gelation prior to this setting. This gelation renders the slurry non-flowable. Thus alumina cements cannot be placed in the wellbore without risking plugging of the tubulars with gelated slurry unless this gelation can be delayed. The antigelants of the present invention keep the slurry flowable until the setting reaction occurs.

The antigelant of the present invention may serve both to prevent the premature gelation and to retard the setting reactions. The antigelant may be used either alone or in conjunction with other set-retarding or accelerating materials.

The wellbore cementing compositions of the present invention include an antigelant selected from the group consisting of phosphino organic acids, phosphonic acids, organic polymers containing phosphinic acid groups, salts thereof, and mixtures thereof in an amount effective to prevent gelation of the cementing composition for a time period of at least three hours. Acceptable antigelants include: polyacrylic acid phosphinate, vinylphosphonic acid; diethylene triamine penta(methylene phosphonic acid); hydroxy-ethylidene diphosphonic acid; aminotris(methylene phosphonic acid) and salts thereof. Acid forms, or forms that are not completely neutralized, are preferred because they are generally more effective.

These compounds are generally available and used commercially, among other things, as scale inhibitors or dispersants. An example of a preferred compound is BELLASOL S-29 (also known as BELSPERSE 161). This is an acrylic acid polymer with sodium phosphinate available from FMC Corp. Another preferred component is BELLASOL S-30 also from FMC Corp. This is also an acrylic acid polymer with sodium phosphinate. Monsanto Corp. markets a DEQUEST series of chemicals that are also preferred. This series includes DEQUEST 2000, amino tri(methylene phosphonic acid); DEQUEST 2010, 1 hydroxyethylidene-1,1 diphosphonic acid; DEQUEST 2060, diethylenetriamine penta(methylene phosphonic acid); DEQUEST 2006, the penta sodium salt of DEQUEST 2000; DEQUEST 2016, the tetra sodium salt of DEQUEST 2010; and DEQUEST 2066, a multi-sodium salt of DEQUEST 2060.

Generally, about two weight percent of the antigelant, based on the weight of the alumina cement of the present invention, is sufficient to prevent gelation of the cementing composition prior to the desired set time.

Cementing compositions of the present invention preferably contain a considerable amount of very fine particles of aggregate, and these very fine particles absorb part of the antigelant because of the surface-active nature of the antigelant. Between about three and about six weight percent of the antigelant (based on the weight of the cement) is therefore preferred when the composition includes very fine particles of aggregate such as fume silica.

The different antigelants of the present invention act as set-retarding agents with differing levels of effectiveness. Thus it may be desirable to use other set-retarding or set-accelerating materials in conjunction with the antigelants to obtain the desired control of both the pumping and setting times. Other components that may be incorporated into the cementing composition include fluid loss additives, suspending agents and dispersants. Salts present in the mixing fluids may also affect the setting time. Thus the antigelant and set control agents must be controlled considering the cementing composition as a whole.

Set-retarding materials that may be used in conjunction with the antigelant materials of the present invention include materials such as lignosulfonates, dicarboxylates, gluconates and mixtures thereof, lignosulfonates, reducing sugars and acids of reducing sugars such as gluconic acid, tartaric acid, glucaric acid, itaconic acid and salts thereof, blends of lignosulfonates with acids or salts of acids of reducing sugars, phosphinic acids and salts thereof, phosphonic acids and salts thereof, aluminum chloride hydrate, calcium sulfate, barium chloride, barium hydroxide, boric acid, cellulose products, glycerine, glycols, hydroxycarboxylic acid and salts thereof, isopropyl alcohol, magnesium chloride, magnesium hydroxide, phosphate, seawater, sodium chloride, sodium sulfate, sugars, starch, and compounds containing these materials and mixtures thereof.

A preferred lignosulfonate is SPERSENE, available from MI Drilling Fluids. Preferred dicarboxylates include oxalic, maleic, succinic, glutaric, adipic, phthalic, fumaric acids and salts thereof.

It can be beneficial to utilize both the antigelant/retarder of the present invention, to prevent premature gelation, and an accelerator to result in the composition curing within a desired time. Known accelerators for alumina cements may be used. Examples include, for example, alkalis and alkaline compounds, anhydrite, calcium hydroxide (hydrated lime), calcium sulfate, calcium sulfate hemihydrate (plaster of Paris), calcium sulfate dihydrate (gypsum), lithium salts including lithium carbonate, Portland cement, potassium carbonate, potassium hydroxide, potassium silicate, sodium carbonate, sodium hydroxide, sodium silicate, sodium sulfate, sulfuric acid, triethanol amine, sodium aluminate, and lithium hydroxide.

Thinners that may be incorporated in the compositions of the present invention include, but are not limited to: polymaleic acid (AQUATREAT AR980); partially neutralized sodium polyacrylate (ALCOSPERSE 602ND); sodium polyacrylate (ALCOSPERSE 149D); polyacrylic acid (DAXAD37); sodium polyacrylate copolymer (DARVAN 811D); and sodium polymethyacrylate (DARVAN 7-S). ALCOSPERSE and AQUATREAT compounds are available from National Starch, DAXAD37 is available from W. R. Grace and DARVAN compounds are available from R. T. Vanderbilt. Other thinners useful in the present invention include, without limitation: polynaphthalene sulfonates (condensation polymers of formaldehyde with naphthalene sulfonic acid); polycarboxylic acids such as polyacrylic acid and polymethacrylic acid, polymaleic acid, and salts thereof; quaternary ammonium compounds such as dialkyldimethyl ammonium chlorides (examples include ARQUAD 2C-75 and ARQUAD HTL8 both available from AKZO Co.) and polyoxyethylated quaternary ammonium salts (an example is ETHOQUAD C/12-75 available from AKZO Co.).

Dispersants may also be utilized in the compositions of the present invention to suspend solids. Some useful antigelation agents, such as BELLASOL compounds, are also useful as dispersants. Other components that are typically incorporated in wellbore cementing compositions may also be utilized in amounts typically used and for the purposes they are typically used in the compositions of the present invention.

The cement composition of the present invention is placed in wellbores by methods well known in the art. When the density of the cement slurry exceeds the fracture gradient of the formation in which the wellbore is to be cemented, the cement may be placed using a coiled tubing unit in stages so that the hydraulic head of unset cement never exceeds the fracture gradient of the formation.

EXAMPLES

For the purposes of the following examples, the following test methods have been employed:

1) "Thickening Time." A stationary paddle is immersed in a cementing composition contained in a heated, rotating cylindrical cup. The torque on the paddle, reflecting the cement's resistance to flow, is measured. The time from the start of the test until it is estimated that the cement can no longer be pumped into a well is termed the thickening time.

2) "Exotherm Time." A sample of the cementing composition, in a sealed, plastic hypodermic syringe with a thermocouple attached, is heated to a test temperature and is placed in a closed Dewar flask that is maintained at the test temperature in an oven. The cement setting reaction is exothermic and a recording of the thermocouple output versus time indicates when the exotherm starts and when it reaches its peak.

The distribution of particle sizes of the solids in the cementing slurry is controlled to be about that which, according to the Furnas particle packing principle, would minimize the volume between solid particles. Table 1 shows the distribution of the solids in the systems used. Distribution 2, having the ten percent Secar 71, has a higher strength at moderate temperatures than does Distribution 1 (five percent Secar 71).

TABLE 1

| MATERIAL | MESH | DISTRIBUTION 1 | | DISTRIBUTION 2 | |
| --- | --- | --- | --- | --- | --- |
| | | LB/BBL | WT % | LB/BBL | WT % |
| MULCOA 60 | 14–28 | 67 | 10 | 67 | 10 |
| MULCOA 60 | –14 | 167 | 25 | 167 | 25 |
| MULCOA 60 | –20 | 134 | 20 | 134 | 20 |
| MULCOA 60 | –325 | 201 | 30 | 167 | 25 |
| FUME SILICA | — | 67 | 10 | 67 | 10 |
| SECAR 71 | — | 34 | 5 | 67 | 10 |
| | | 670 | 100 | 669 | 100 |

Water content for slurries of both Distribution 1 and Distribution 2 are 16 percent by weight of the solids (107 lb/bbl). This amount of water results in a non-settling slurry when combined with an appropriate amount of dispersant, retarder, antigelant and suspending agents.

To prepare the cement slurries, a suspending agent (XCD, an xanthan gum from Kelco) was first stirred into the fresh water and allowed to fully hydrate (at least 15 minutes). Then when a dispersant/retarder (SPERSENE, a chrome lignosulfonate from MI Drilling Fluids) was included, it was added with continued stirring (about 5 minutes). The antigelant (BELLASOL S-29) was then added and stirred for about three minutes.

The aggregate solids, beginning with the smallest particles, were then added with continued stirring for about five minutes. This resulted in uniform slurries. Finally, the alumina cement (SECAR 71) was added and stirred for about three minutes to produce the final slurry.

Cement slurries having densities of 18.5 pounds per gallon were mixed with each of solids distributions 1 and 2. Both slurries contained 0.5 lb/bbl XCD xanthan gum suspending agent, 1.35 lb/bbl BELLASOL S-29 retarder/antigelant, and 16 percent water by weight of the solids. The slurries were cured for seven days at 120° F., and then fired for twenty hours at 1600° F. Crush tests were made before and after firing to determine compressive strengths. Distribution 1 had strengths of 90 psi and 1025 psi before and after firing respectively. Distribution 2 had strengths of 828 psi and 2435 psi before and after firing respectively.

The set of tests shown as Table 2 illustrate the actions the dispersant, antigelant, and suspending agents. These tests were run using the solids Distribution 1. The suspending agent XCD was used in all of the mixes.

TABLE 2

| Test No. | XCD LB/BBL | SPERSENE LB/BBL | BELLASOL S-29 | | Exotherm Time hr:min | Temp. °F. |
| --- | --- | --- | --- | --- | --- | --- |
| | | | % bwow | % bwos | | |
| 1 | 0.5 | 2.0 | 0.5 | 0.08 | 1:40 | 100 |
| 2 | 0.5 | 2.0 | 1.0 | 0.16 | 4:20 | 100 |
| 3 | 0.5 | 0 | 1.5 | 0.24 | 3:43 | 120 |

TABLE 2-continued

| Test No. | XCD LB/BBL | SPERSENE LB/BBL | BELLASOL S-29 % bwow | BELLASOL S-29 % bwos | Exotherm Time hr:min | Temp. °F. |
|---|---|---|---|---|---|---|
| 4 | 0.5 | 0 | 1.75 | 0.28 | 8:44 | 120 |
| 5 | 0.5 | 0 | 2.0 | 0.32 | 24:26 | 120 |
| 6 | 0.75 | 0 | 3.0 | 0.48 | 60:35 | 120 |

Tests 1 and 2 indicate that the antigelant BELLASOL S-29 functions also as a set retardant.

Tests 2 and 3 show that the dispersant SPERSENE functions also as a set retardant because even with an increased amount of BELLASOL S-29, the set time decreased with the SPERSENE removed. Tests 3 through 6 show the increasing set retardation with increasing amounts of BELLASOL S-29. Tests 3 through 6 also show, because a non-setting slurry was provided, that the BELLASOL S-29 also is an effective dispersant, making the SPERSENE unnecessary in the systems of this example.

Tests summarized in Table 3 show that both a dispersant and an antigelant are useful under some conditions. The aggregates and water alone cannot be mixed in a slurry. Also the aggregates, water, and SPERSENE mix to form a fluid slurry but when the SECAR is added the slurry becomes unmixable within three minutes even though the exothermic setting reaction occurs considerably later.

Different antigelants, even various members of the same chemical family, behave quite differently in the cement slurries. As examples, Table 3 lists the gelling and setting properties noted for several members of the BELLASOL family (poly acrylic acid with sodium phosphinate), including BELLASOL S-29. The tests were made at 120° F. with solids Distribution 2 at an antigelant concentration of 3.35 lb/bbl of slurry and 0.5 lb/bbl XCD as a suspending agent. The table also shows the effects of an additional retarder (SPERSENE) on the setting properties. Setting times and gelation times are relatively short for tests of Table 3 compared to those of Table 2 because the solids Distribution 2 includes 10% of cement as opposed to 5% in solids Distribution 1.

Stirability imparted to the alumina cement slurries by the antigelant materials is further demonstrated by the thickening time tests shown as Table 4. These tests were at 120° F. using solids Distribution 2, 0.5 lb/bbl XCD, amounts of BELLASOL S-29 listed in Table 4, and no additional dispersants or retarders.

TABLE 4

| TEST NO. | BELLASOL S-29 LB/BBL | TIME TO EXOTHERM PEAK HOUR:MINUTE | THICKENING TIME |
|---|---|---|---|
| 17 | 2.95 | 6:34 | 2:20 |
| 18 | 3.48 | 154:57 | 17:52 |
| 19 | 3.82 | 92:47 | 11:15 |
| 20 | 4.06 | 139:31 | 19:30 |

These data show that the antigelants can extend the gelation times of the alumina cement slurries sufficiently to allow safe placement in wells.

We claim:

1. A high alumina wellbore cementing composition comprising:
   a) high alumina cement; and
   b) a polyacrylic acid phosphinate having a molecular weight of about 3800 in an amount effective to prevent gelation of the cementing composition for a time period of at least three hours.

2. The wellbore cementing composition of claim 1 further comprising an additional component effective as a set retarder.

3. The wellbore cementing composition of claim 1 further comprising an additional component effective as a retarder

TABLE 3

| TEST NO. | ADDITIVE NAME | ADDITIVE MOL. WT. | SPERSENE LB/BBL | EXOTHERM TIMES START HOUR:MINUTE | EXOTHERM TIMES PEAK HOUR:MINUTE | GELATION TIME More Than HOUR:MINUTE | GELATION TIME Less Than HOUR:MINUTE |
|---|---|---|---|---|---|---|---|
| 7 | DP3152 | 900 | 0 | 1:42 | 3:04 | — | — |
| 8 | BELLASOL S-30 | 2000 | 0 | 1:13 | 2:53 | — | — |
| 9 | " | " | 0.8 | 3:01 | 5:29 | 00:30 | 1:00 |
| 10 | " | " | 1.0 | 3:37 | 6:27 | 00:30 | 1:00 |
| 11 | BELLASOL S-29 | 3800 | 0 | 1:53 | 9:22 | — | — |
| 12 | " | " | 1.0 | 12:19 | 30:35 | 24:18 | 89:09 |
| 13 | " | " | 2.0 | 103:35 | 123:05 | 89:00 | 128:00 |
| 14 | DP3326 | 8000 | 0 | 0:24 | 1:24 | — | — |
| 15 | " | " | 1.0 | 2:43 | 5:10 | — | 0:37 |
| 16 | " | " | 2.0 | 7:05 | 11:05 | — | 0:37 |

At the additive concentration of Test Nos. 7 through 16 (3.35 lb/bbl), each of these four materials gave satisfactory initial antigelant and dispersant actions but none, acting alone, had a sufficient set-retarding ability. When an effective retarder (SPERSENE) was added, only BELLASOL S-29 retained its antigelant properties long enough to make the system useful for wellbore cementing.

selected from the group consisting of: dicarboxylates, gluconates, reducing sugars, acids of reducing sugars, phosphinic acids and salts thereof, and phosphonic acids and salts thereof.

4. The wellbore cementing composition of claim 1 further comprising lignosulfonate.

5. The wellbore cementing composition of claim 1 further comprising a alumina aggregate.

6. The wellbore cementing composition of claim 1 further comprising fume silica.

7. A method to cement a wellbore wherein the wellbore will be exposed to elevated temperatures comprising the steps of:

providing a cementing composition, the cementing composition comprising a) high alumina cement, and b) a polyacrylic acid phosphinate having a molecular weight of about 3800 in an amount effective to prevent gelation of the cementing composition for a time period of at least three hours;

placing the cementing composition in the wellbore prior to gelation of the cementing composition; and allowing the cementing composition to set within the wellbore.

8. The method of claim 7 wherein the wellbore cementing composition further comprises an additional component effective as a set retarder.

9. The method of claim 7 wherein the cementing composition further comprises an additional component effective as a retarder selected from the group consisting of: dicarboxylates, gluconates, reducing sugars, acids of reducing sugars, and phosphonic acids and salts thereof.

10. The method of claim 7 wherein the wellbore cementing composition 11 further comprises lignosulfonate.

11. The method of claim 7 wherein the wellbore cementing composition further comprises a alumina aggregate.

12. The method of claim 7 wherein the wellbore cementing composition further comprises fume silica.

* * * * *